Nov. 15, 1938.  W. A. DUFFIELD  2,136,419
AUTOMATIC POWER TRANSMISSION
Filed July 24, 1935    2 Sheets-Sheet 1

INVENTOR
William A. Duffield
BY
ATTORNEY

Nov. 15, 1938.   W. A. DUFFIELD   2,136,419
AUTOMATIC POWER TRANSMISSION
Filed July 24, 1935   2 Sheets-Sheet 2

INVENTOR
William A. Duffield
BY
Hanbury a. Sadden
ATTORNEY

Patented Nov. 15, 1938

2,136,419

UNITED STATES PATENT OFFICE 2,136,419

AUTOMATIC POWER TRANSMISSION

William A. Duffield, Montreal, Quebec, Canada, assignor to Juno Corporation Limited, Montreal, Quebec, Canada, a corporation Application July 24, 1935, Serial No. 32,939

10 Claims. (Cl. 74—189.5)

This invention relates to the variable transmission of power and particularly to mechanism including a fluid clutch of the Fottinger type, adapted to provide an automatic operation suitable for motor vehicles and the like.

The object of the invention is to provide an improved automatic variable transmission in which the power absorbed by its operation at all variations of speed is reduced to a minimum and is used with the greatest efficiency.

A further object is to provide a transmission of this type in which the planetary gear embodied in it, is employed in a reverse drive by simple compact and highly efficient means.

Hitherto in transmissions of this type it has been usual to take the power to drive the fluid clutch from the drive shaft, thereby reducing the amount of power to be acted on by the reduction gear and transmitted to the driven shaft.

In the present invention the power from the drive shaft is first acted on by the reduction gear and the power required to drive the fluid clutch is taken from the driven shaft. By this means a greater amount of available effective power is secured.

The invention consists briefly in a drive shaft, planetary reduction gears, a driven shaft on which a fluid clutch is mounted, one member of which is secured to the carrier of the gears. It also includes the reverse attachment to the gears.

Figure 1:
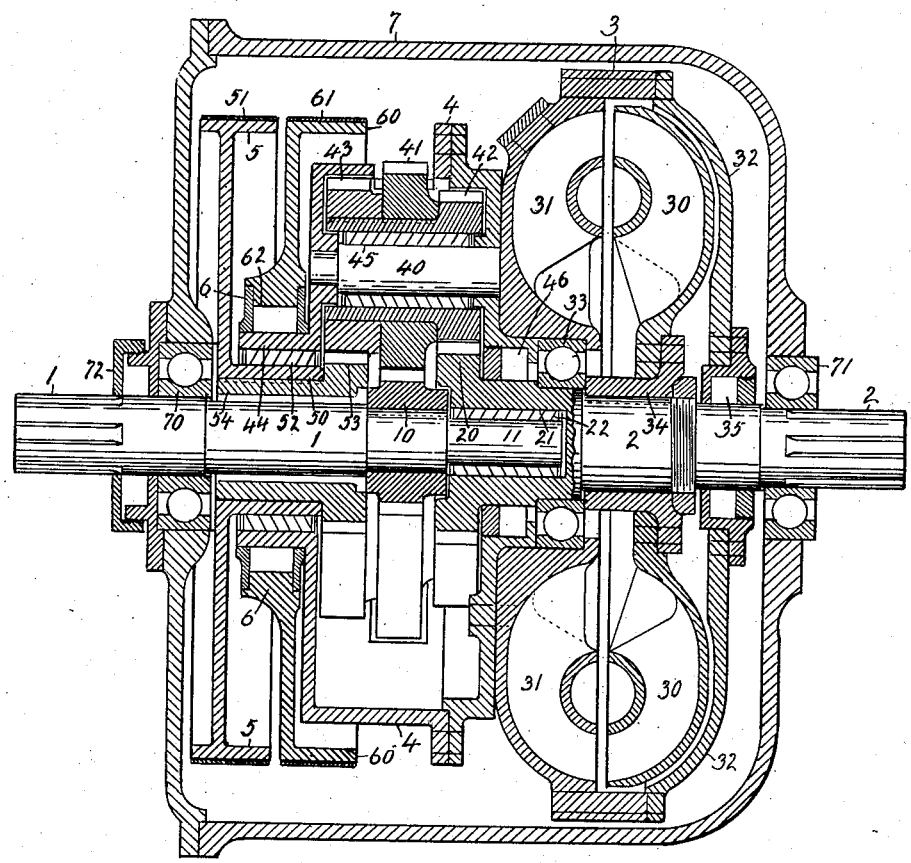
Figure 2:
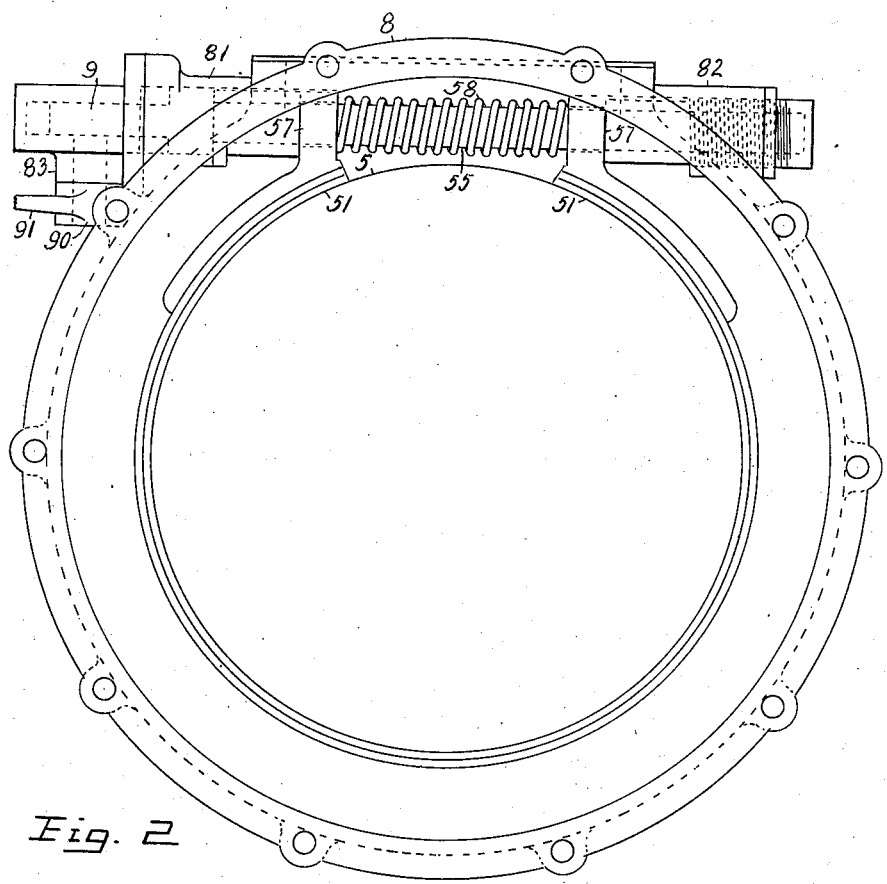
Figure 3:
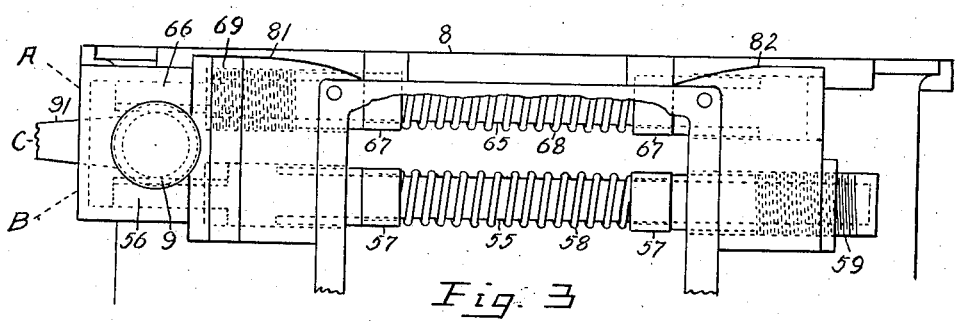

Reference is made to the accompanying drawings in which Fig. 1 is a vertical longitudinal section of the invention in one form in which it has been developed. Fig. 2 a side view of the brake band control. Fig. 3 a plan view of the same.

The scope of the invention is not limited to this particular construction.

The main shaft 1, which is coupled by the usual clutch to the crank shaft of a prime mover, (not shown) is journalled in bearings 70 in the casing 7.

The shaft 1 has a pinion 10 and an extension 11.

The tail shaft 2 which is journalled in bearings 71 in the casing 7 axially with shaft 1, has a bore 21 with bearings 22 to journal the extension 11 of the shaft 1. The shaft 2 has a pinion 20 adjacent the pinion 10.

A carrier 4 journalled on bearings 33 and 52 has a series of pins 40 parallel to the axis of the shafts 1 and 2 with bearings 45 on which are mounted triple planetary gears 41, 42, 43. The large center gear 41 meshes with the pinion 10 on the main shaft. The small gear 42 meshes with the pinion 20 on the tail shaft 2. The intermediate gear 43 meshes with a pinion 53 on a sleeve 54 journalled on the shaft 1. The sleeve 54 is keyed to a sleeve 50 of a brake drum 5 controlled by a brake band 51.

The carrier 4 has a sleeve 44 journalled on the bearings 52 on the sleeve 50 of the brake drum 5.

On the sleeve 44 is mounted an over running clutch 6 with rollers 62. The clutch 6 is the hub of a brake drum 60 controlled by a brake band 61.

On the tail shaft 2 is keyed a sleeve 34 to which is bolted one member 30 of a fluid coupling 3 of the Fottinger type. The other member 31 is secured to the carrier 4 and is journalled on bearings 33 on shaft 2.

This member 31 has a housing 32 which extends over the member 30 to the shaft 2 and ending in a packing ring 35.

The carrier 4 has a packing ring 46 on the shaft 2.

There is also a packing ring 72 on the casing 7 around the shaft 1 outside the bearings 70.

Suitable controls for the bands 51 and 61 are provided.

The three gears 41, 42 and 43 are keyed together to form an integral body.

With this construction it will be seen that the drive of the shaft 1 while the carrier 4 is at rest, will be through pinion 10, gear 41, gear 42, pinion 20 to tail shaft 2, and thereby producing the reduction effected by the gears.

As the tail shaft 2 rotates it carries with it the member 30 of the fluid coupling 3 at the reduced speed.

As the load on the tail shaft 2 is picked up and the speed of rotation of the member 30 increases, it gradually couples with the member 31 as the slip between them decreases.

When the member 31 begins to rotate it carries with it the carrier 4. The rotation of the carrier 4 lessens the reduction effect of its gears and increases the speed of rotation of the tail shaft 2, until finally the drive from the shaft 1 to the shaft 2 is practically direct. When the load increases or the vehicle is slowed down by its brakes the reverse operation takes place and the reduction gear is automatically cut in smoothly and without strain.

Every variation of drive speed is thus provided for by mechanism, without any manual gear changing.

In starting, the overrunning clutch 6 prevents the carrier from reverse rotation. But when the carrier is being driven by the fluid coupling the overrunning clutch can be released.

In order to reverse the drive of the tail shaft, the overrunning clutch is released to permit the carrier to change the direction of its rotation.

The pinion 53 is held stationary by the band 51 on the brake drum 5. The drive of the pinion 10 on the gear 41 causes the integral gears 40, 41 and 42 to travel around their pinions driving the carrier in reverse rotation. But as the small gear 42 takes longer to complete a circuit of the tail shaft pinion 20 than the gear 40 takes around the stationary pinion 53, the pinion 20 and tail shaft 2 are driven in reverse rotation. This reverse drive is at very low speed as is required.

In Figures 2 and 3 an improved form of band control is shown. In this a ring 8 bolted to the casing 7, has two guideways 81 and 82 bored to receive the rods 55 and 65. The rods 55 and 65 have racks 56 and 66 at one end and pass through the bored terminals 57 and 67 of the bands 51 and 61. Coil springs 58 and 68 are mounted on the rods 55 and 65 between their respective terminals and are adapted to hold the bands loose.

The guideway 81 has a vertical bearing 83 in which the spindle 90 of the pinion 9 is journalled. This pinion meshes with the racks 56 and 66 and is controlled by a lever 91 operated by the usual treadle or hand lever.

In the position of the lever 91 in Fig. 3 which is in neutral, both bands are loose. When the lever 91 is moved to the position A the band 51 is held tight while the band 61 is loose. When the lever 91 is moved to the position B the band 51 is loose and the band 61 is tight.

As the band 51 controls the reversing pinion, the position of the lever 91 to reverse is A.

In starting as the belt 61 must be tight to close the overrunning clutch and prevent the carrier from reverse rotation the lever 91 will take the position B.

When the transmission has speeded up and the carrier is rotating rapidly the lever 91 can be moved to the intermediate position C. This relieves the overrunning clutch from excessive wear during the direct drive of the transmission.

What I claim is:

1. In an automatic power transmission, a fluid coupling of the Fottinger type having driver and runner members, a power driven shaft, a tail shaft journalled axially therewith, pinions on each shaft, a carrier journalled about the shafts, integral gears journalled in the carrier parallel to the shafts and meshing with the pinions, the driver member of the coupling secured to the tail shaft and the runner member secured to the carrier, a third gear integral with the other gears, a sleeve journalled on the driven shaft having a pinion meshing with the third gear and means to hold the sleeve from rotation.

2. In an automatic power transmission, a fluid coupling of the Fottinger type, a power driven shaft, a tail shaft, journalled axially therewith, pinions on each shaft, a carrier journalled about the shafts, a one-way brake for the carrier, means to release the brake, integral gears journalled on the carrier parallel to the shafts meshing with the pinions, one member of the coupling secured to the tail shaft, the other member secured to the carrier.

3. In an automatic power transmission, a fluid coupling of the Fottinger type, a power driven shaft, a tail shaft, journalled axially therewith, pinions on each shaft, a carrier journalled about the shafts, a one-way brake on the carrier mounted on a brake drum having a controlling brake band, integral gears journalled on the carrier parallel to the shafts meshing with the pinions, one member of the coupling secured to the tail shaft, the other member secured to the carrier, a third gear integral with the other gears, a sleeve journalled on the driven shaft having a pinion meshing with the third gear and a brake drum for the sleeve having a controlling brake band.

4. In an automatic power transmission, a fluid coupling of the Fottinger type, having driver and runner members, a casing, a power driven shaft journalled in the casing, a tail shaft journalled in the casing axially to the driven shaft and journalling the end of the driven shaft, adjacent pinions on the shafts, a carrier journalled about the shafts, an extension on the carrier having an adjustable one-way brake thereon, integral gears journalled in the carrier parallel to the shafts and meshing with the pinions, a sleeve on the tail shaft bolted to the driver member of the coupling, the runner member secured to the carrier.

5. In an automatic power transmission, a fluid coupling of the Fottinger type, a casing, a power driven shaft journalled in the casing, a tail shaft journalled in the casing axially to the driven shaft and journalling the end of the driven shaft, adjacent pinions on the shafts, a carrier journalled about the shafts, an extension to the carrier, having a one-way brake on the carrier mounted on a brake drum having a controlling brake band, integral gears journalled in the carrier parallel to the shafts and meshing with the pinions, a sleeve on the tail shaft bolted to one member of the coupling, the other member secured to the carrier, a third gear integral with the other gears, a sleeve journalled on the driven shaft having a pinion meshing with the third gear and a brake drum for the sleeve having a controlling brake band.

6. In an automatic power transmission, a fluid coupling of the Fottinger type, a power driven shaft, a tail shaft journalled axially therewith, pinions on each shaft, a carrier journalled about the shafts, integral gears journalled in the carrier parallel to the shafts meshing with the pinions, one member of the coupling keyed to the tail shaft, the other member secured to the carrier, a third pinion meshing with the gears, a brake control for this pinion, a one-way brake on the carrier mounted on a brake drum having a controlling brake band.

7. In an automatic power transmission, a fluid coupling of the Fottinger type, a power driven shaft, a tail shaft journalled axially therewith, pinions on each shaft, a carrier journalled about the shafts, a one-way brake on the carrier mounted on a brake drum having a controlling brake band, integral gears journalled on the carrier parallel to the shafts, meshing with the pinions, one member of the coupling secured to the tail shaft, the other member secured to the carrier, a third gear integral with the other gears, a pinion meshing therewith, a brake control for this pinion and means to reverse the operation of the one-way brake and the brake of the third gear pinion.

8. In an automatic power transmission, a fluid coupling of the Fottinger type, a power driven shaft, a tail shaft journalled axially therewith, pinions on each shaft, a carrier journalled about the shafts, a one-way brake on the carrier mounted on a brake drum having a controlling brake band, integral gears journalled on the carrier parallel to the shafts, meshing with the pinions, one member of the coupling secured to the tail shaft, the other member secured to the carrier, a third gear integral with the other gears, a pinion meshing therewith, a brake control for this pinion and a three-way control for the one-way brake and the brake of the third gear pinion, adapted to operate either brake or to release both brakes.

9. In an automatic power transmission, a fluid coupling of the Fottinger type, a power driven shaft, a tail shaft journalled axially therewith, pinions on each shaft, a carrier journalled about the shafts, a one-way brake on the carrier mounted on a brake drum having a controlling brake band, integral gears journalled on the carrier parallel to the shafts, meshing with the pinions, one member of the coupling secured to the tail shaft, the other member secured to the carrier, a third gear integral with the other gears, a pinion meshing therewith, a brake control to this pinion and means to reverse the operation of the carrier brake and the brake of the third gear pinion, comprising brake drums to each brake, brake bands thereon, bored terminals on the bands, rods through the terminals on fixed slideways, inwardly facing racks on the rods, a pinion vertically journalled in the slideway meshing with the racks and a lever controlling the pinion.

10. In a power transmission, a power driven shaft, a tail shaft, plantetary reduction gear between the shafts, a reversing gear integral with the planetary gear, a pinion meshing with the reversing gear, a brake to control this pinion, a carrier in which the gears are journalled, a one-way brake for the carrier, means to reverse the operation of the brakes and a fluid coupling of the Fottinger type between the carrier and the tail shaft.

WILLIAM A. DUFFIELD.